(12) United States Patent
Okawa et al.

(10) Patent No.: US 7,847,854 B2
(45) Date of Patent: Dec. 7, 2010

(54) IMAGING APPARATUS WITH AF OPTICAL ZOOM

(75) Inventors: Akira Okawa, Yokohama (JP); Takaaki Yonekawa, Yokohama (JP); Noriyuki Uenishi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 512 days.

(21) Appl. No.: 11/882,566

(22) Filed: Aug. 2, 2007

(65) Prior Publication Data

US 2008/0074530 A1 Mar. 27, 2008

(30) Foreign Application Priority Data

Sep. 27, 2006 (JP) .............................. 2006-262533

(51) Int. Cl.
*H04N 5/232* (2006.01)
(52) U.S. Cl. ....................... 348/345; 348/347; 348/349; 348/351; 348/356
(58) Field of Classification Search ............ 348/208.12, 348/345, 362, 363, 364, 366, 370, 234, 235, 348/236, 347, 349, 351, 356
See application file for complete search history.

(56) References Cited

U.S. PATENT DOCUMENTS 5,946,504 A * 8/1999 Hirasawa et al. .............. 396/80
6,163,340 A * 12/2000 Yasuda ........................ 348/345
6,972,798 B1 * 12/2005 Takei .......................... 348/349
2003/0048372 A1 * 3/2003 Yasuda ........................ 348/349
2006/0232696 A1 * 10/2006 Ito et al. ...................... 348/345

FOREIGN PATENT DOCUMENTS

| JP | 04-111683 | 4/1992 |
| JP | 04-172779 | 6/1992 |
| JP | 08-015601 A | 1/1996 |
| JP | 2005-338514 A | 12/2005 |
| KR | 1995-0007867 | 3/1992 |
| KR | 10-2004-0036401 A | 4/2004 |
| KR | 10-2005-0123001 A | 12/2005 |

* cited by examiner

*Primary Examiner*—Nhan T Tran
*Assistant Examiner*—Don Nguyen
(74) *Attorney, Agent, or Firm*—Arnet Fox, LLP

(57) ABSTRACT

A novel imaging apparatus capable of correcting a focus state by an AF detection value both simply and surely has been disclosed. The imaging apparatus comprises an auto-focus drive section for moving a lens, an AF processing section for calculating an AF detection value indicating the focus state from imaging data, a luminance processing section for calculating a luminance value from the imaging data, a correction section for calculating a corrected AF detection value by correcting the calculated AF detection value by the calculated luminance value, and a control section for controlling the auto-focus drive section based on the calculated corrected AF detection value. The imaging data is data not having been subjected to auto-exposure processing.

9 Claims, 7 Drawing Sheets

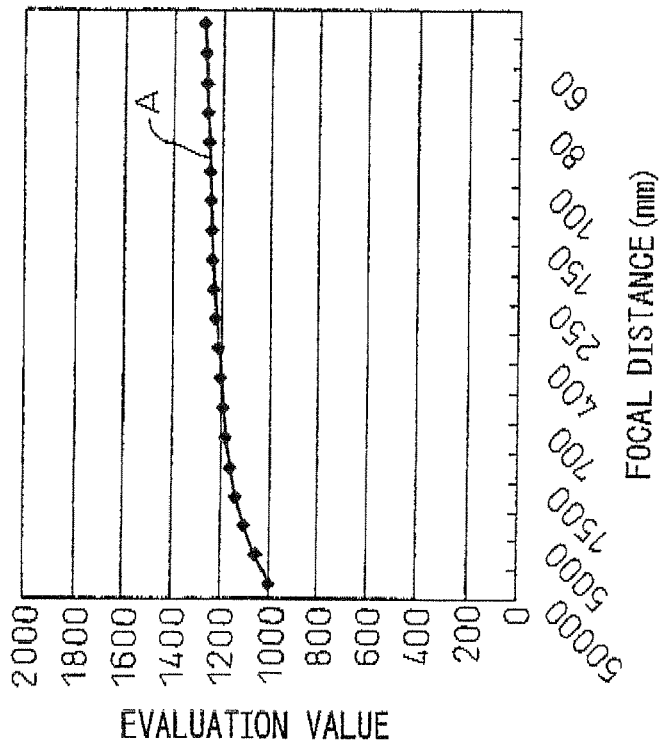

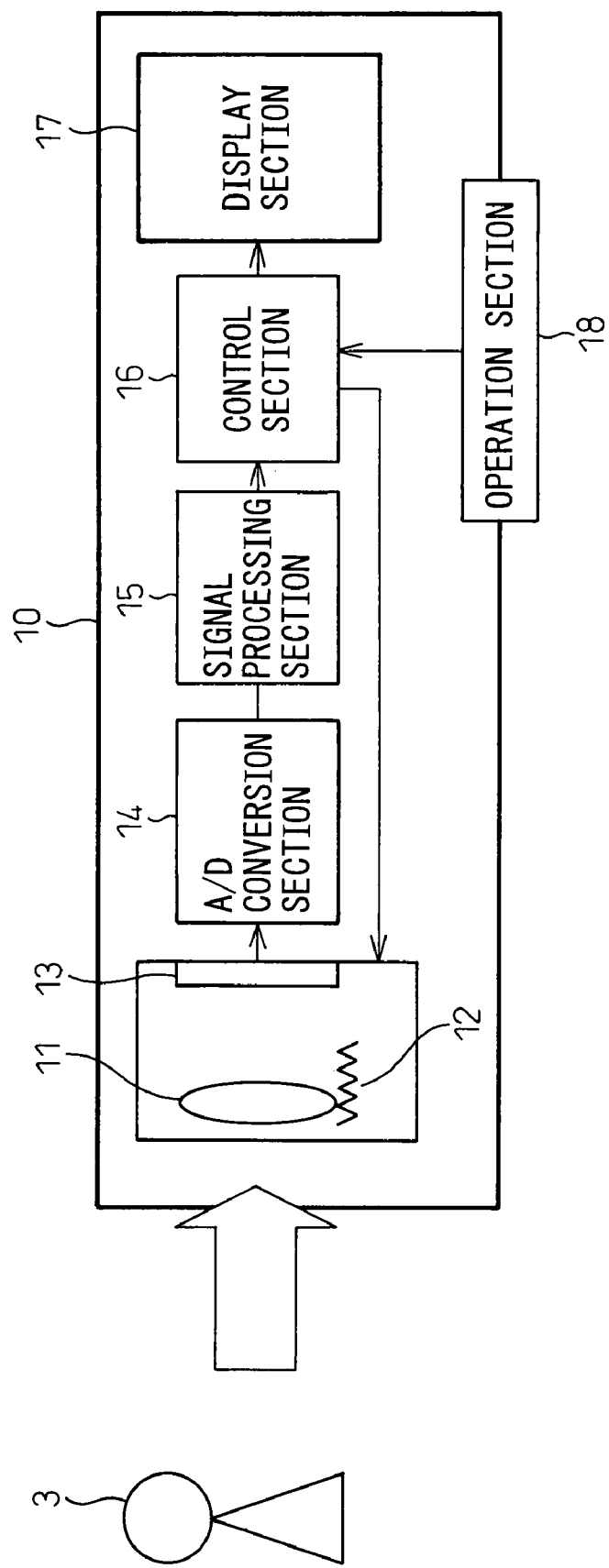

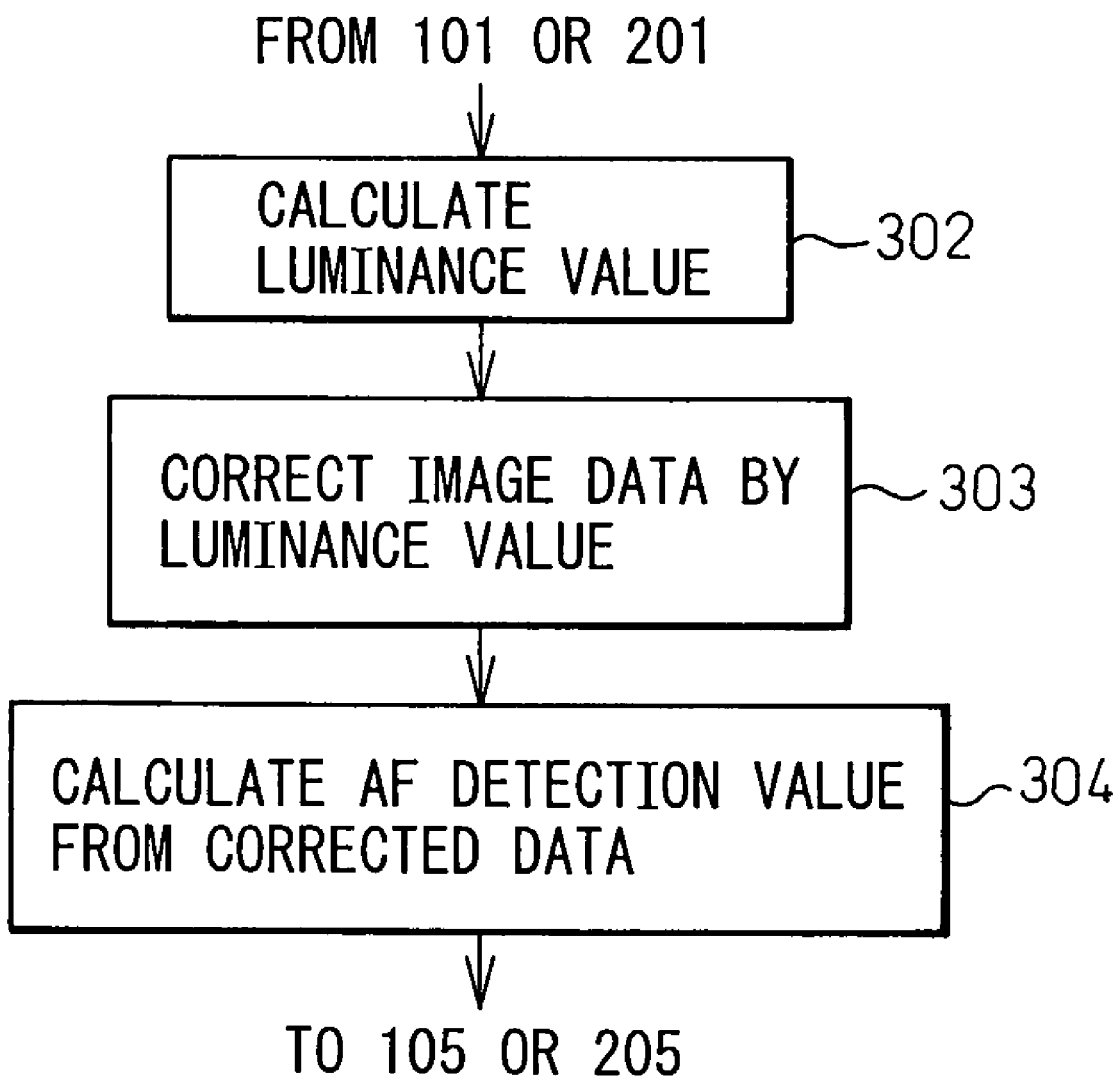

IMAGING APPARATUS WITH AF OPTICAL ZOOM

CROSS REFERENCE TO RELATED APPLICATION

This application is based upon and claims the benefit of priority from the prior Japanese Patent Application No. 2006-262533, filed on Sep. 27, 2006, the entire contents of which are incorporated herein by reference.

BACKGROUND OF THE INVENTION

The present invention relates to a digital imaging apparatus, having an auto-focus function, including a digital camera and a camera attached to a mobile phone and, more particularly, to a technique to improve the focus position accuracy of a digital imaging apparatus.

In a digital camera, the equipping of an auto-focus function for automatically focusing the camera has become widespread due to the increase in the number of pixels and an advance in functionality. The present invention is an invention of an auto-focus technique for judging a focus position by a detection value at each measurement point by shifting the focal point by moving the position of a lens.

In general, the focus state of an image is judged by the amount of high frequency components extracted by subjecting imaging data obtained by an imaging device, such as a CCD and a CMOS sensor, to a bypass filter, however, there may be various other methods. The auto-focus system is described in, for example, patent documents 1 and 2, and is widely known, and therefore, the explanation is omitted here. The present invention can be used for a detection method of any focus state and here, a value indicating a focus state calculated from imaging data is referred to as an AF detection value.

In a general auto-focus system, a lens is moved at a predetermined pitch from a nearest point (the infinite end side in the focus range) toward a farthest point (the proximate end side in the focus range) in a movement range (focus range), the AF detection value is calculated from the imaging data at each point, the position at which the AF detection value is maximum is determined as the focus position, and the lens is moved to this position. Specifically, the lens is moved from the nearest point toward the farthest point, the beginning of a decrease in the AF detection value after it has passed the peak value is detected, and the lens is moved to the position of the peak value. This method is called a mountain-climbing method.

FIG. 1A and FIG. 1B are diagrams for explaining processing of judging the focus position by the above-mentioned conventional system; FIG. 1A shows the measurement values of the focal distance and the AF detection value at the measurement points and FIG. 1B shows a graph when the horizontal axis represents the focal distance and the vertical axis represents the evaluation value (AF detection value).

In this example, the lens is moved sequentially from the infinite end side (50,000 mm) in the focus range toward the proximate side in the focus range while calculating the AF detection value and the calculated AF detection value is used as the evaluation value. The focal distance at which the AF detection value is maximum (the peak value) is judged to be the focal position, however, in this example, it is judged that the position at 50 mm on the proximate side shown by P is best in focus and the lens is moved thereto.

In general, the calculation of the AF detection value is performed for the imaging data in a predetermined range (AF detection frame), as an object, among imaging data acquired by the imaging apparatus. There is a case where plural ranges are included however, the most general range is a case where one range is included in the center portion of an image.

FIG. 2A and FIG. 2B are examples of an image photographed by a digital camera, a composition in which reference number 1 denotes a display frame of an image display device such as an LCD, 2 denotes an AF detection frame, and a human being 3 is located in the center of the image. FIG. 2A is an image when the lens is located at the infinite end and FIG. 2B is an image when the lens is at the proximate end. In this case, the image in FIG. 2B will be magnified than the image in FIG. 2A due to the influence of the optical zoom (there may be a case where the situation is reversed, that is, the image is reduced, depending on the lens configuration). The degree of magnification differs depending on the lens configuration. The AF detection frame 2 is constant irrespective of input images and therefore the subject (human being) in the AF detection frame 2 is magnified in the image in FIG. 2B.

As shown in FIG. 2A and FIG. 2B, if an object with high luminance, such as a fluorescent lamp, is included in the AF detection frame 2, the fluorescent lamp 4 is also magnified due to the influence of the optical zoom and the ratio occupied by the fluorescent lamp 4 with high luminance within the AF detection frame 2 increases, affecting the AF detection value. Consequently, if the focus position is judged using only the AF detection value as the evaluation value, the phenomenon of magnification of the object with high luminance becomes outstanding on the proximate side due to the influence of the optical zoom and an erroneous judgment is made that the focus position is located at a position nearer to the proximate side than the original position of the subject.

Japanese Unexamined Patent Publication (Kokai) No. 8-15601 describes an auto-focus circuit that has reduced the influence of luminance by detecting the average value of the high region component of a luminance signal in an integrator circuit as well as detecting the peak value (corresponding to the AF detection value) of the high region component of the luminance signal in the auto-exposure (AE)-controlled imaging signal (data) and by multiplying a predetermined coefficient to calculate a direct current level and subtracting the peak value in the high region component.

Further, Japanese Unexamined Patent Publication (Kokai) 2005-338514 describes a lens control apparatus that calculates the difference value between the luminance value multiplied by a predetermined coefficient and the contrast value (corresponding to the AF detection value) and changes the movement direction and the movement speed of the lens when the difference value is greater than a threshold value.

SUMMARY OF THE INVENTION

As described above, the influence of the luminance value on the AF detection value has been reduced conventionally. However, the configuration described in Japanese Unexamined Patent Publication (Kokai) No. 8-15601 handles AE-controlled imaging signal data as an object and as described in patent document 2, there is a problem that if auto-focus processing is performed while the AE control is performed, the quantity of operation processing is increased or a problem that it is no longer possible to acquire a stable AF detection value because the brightness of the subject changes when AF is started on the way of the AE convergence, and therefore, in general, the AE processing is not performed when the auto-focus processing is performed, and particularly in the case of an inexpensive camera, such as one attached to a mobile phone, the processing described in Japanese Unexamined Patent Publication (Kokai) No. 8-15601 cannot be applied.

Further, with the configuration described in Japanese Unexamined Patent Publication (Kokai) No. 2005-338514, there is a problem in that the variation of the calculated difference value does not necessarily specify proper correction.

The present invention solves these problems and an object thereof is to realize a novel imaging apparatus that has made it possible to correct a focus state by an AF detection value both easily and securely.

In order to solve the above-mentioned problems, according to the present invention, a shift caused by the occurrence of the influence of the optical zoom by the drive of a lens is corrected by the rate of change in the luminance value and the corrected value is utilized as an AF evaluation value.

According to the present invention, the luminance at each detection point is also calculated at the time of AF detection and a rise due to the luminance is suppressed by multiplying the AF detection value by the inverse of the rate of change in luminance as a coefficient. Specifically, the corrected AF detection value is a value that is the AF detection value multiplied by the ratio of the luminance value at the start point to the luminance value calculated at each point.

The present invention is applied to imaging data not subjected to auto-exposure processing.

The AF detection value is an added-up value of the AF detection value in a predetermined auto-focus frame in imaging data and the luminance value is an added-up value of the luminance value in the auto-focus frame.

Although the present invention can be applied to the above-mentioned mountain-climbing method, it may also be possible to acquire imaging data at every point in the auto-focus range by varying the focus position from the start point to the end point in the auto-focus range, calculate the corrected AF detection value from the imaging data, judge the position at which the calculated corrected AF detection value exhibits the peak value as the focus position, and move the lens to the judged focus position.

Further, it may also be possible to calculate corrected imaging data by multiplying the imaging data by the ratio of the luminance value at the start point to the luminance value calculated at each point, calculate the AF detection value from the corrected imaging data, and use this as the evaluation value.

As in the prior art, if the focus position judgment is performed using only the detection value, the focus position may be judged erroneously when the detection value includes another factor, however, according to the present invention, it is made possible to correctly derive the focus position by using the luminance vale as a correction coefficient. Further, the processing is simple and can be performed easily.

It is made possible for an imaging apparatus (a digital camera) to which the present invention has been applied to correctly derive the focal point of a subject by deriving a proper evaluation value by canceling the influence of the optical zoom and judging the focus position using the evaluation value without erroneously making a judgment as conventionally.

BRIEF DESCRIPTION OF THE DRAWINGS

The features and advantages of the invention will be more clearly understood from the following description taken in conjunction with the accompanying drawings, in which:

FIG. 1A and FIG. 1B are diagrams for explaining conventional focus position calculation processing.

FIG. 3 is a diagram showing a configuration of an AF camera in a first embodiment of the present invention.

FIG. 7 is a flow chart showing the focus position calculation processing in a third embodiment.

PREFERRED EMBODIMENTS OF THE PRESENT INVENTION

Figure 2A:
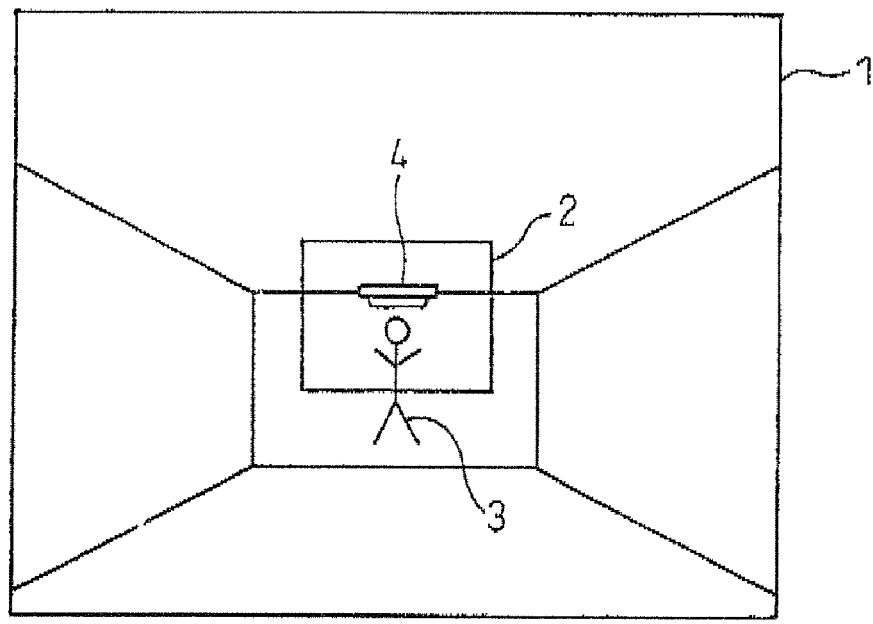
FIG. 2A and FIG. 2B are diagrams showing an example of an image used for explanation.
Figure 2B:
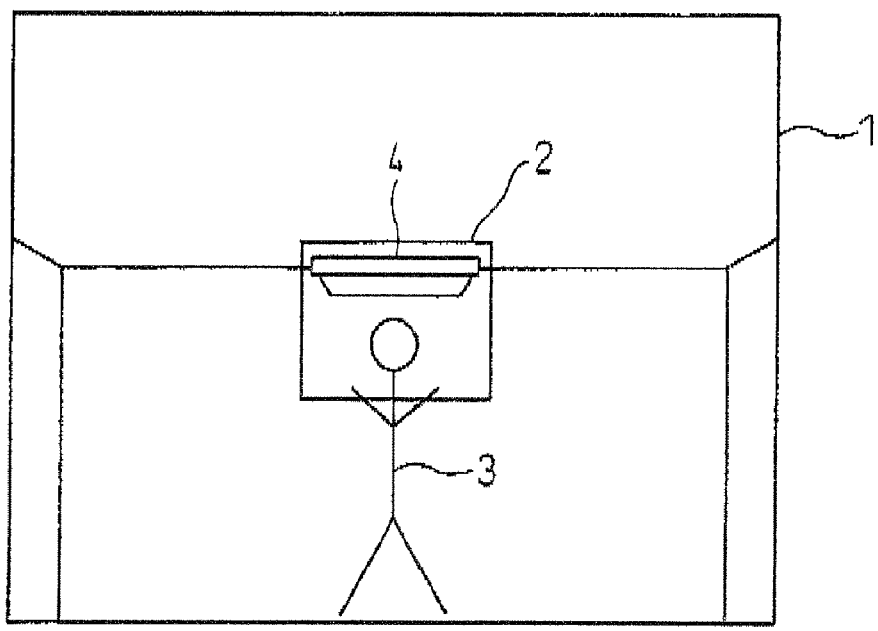

FIG. 3 is diagram showing a configuration of an auto-focus (AF) camera 10 in a first embodiment of the present invention. As shown in FIG. 3, the AF camera 10 comprises a lens section 11, an auto-focus drive section 12 for varying the focal distance to a subject by moving the lens of the lens section 11, a sensor section 13 for converting an image projected by the lens section 11 into an electric signal, an A/D conversion section 14 for analog-to-digital (A/D)-converting the electric signal from the sensor section 13, a signal processing section 15 for processing the digital imaging data from the A/D conversion section 14, a control section 16 for controlling each section, a display section 17 for displaying an imaged image, and a user interface of activation/termination of a camera, start/stop of auto-focus, start of photographing, etc., and also having an operation section 18 for delivering the control signal to the control section.

The auto-focus drive section 12 is capable of changing the distance to the sensor section into the distance of a subject in focus by moving the lens in accordance with the control by the control section 16. The sensor section 13 has a CCD, a C-MOS sensor, and the like, and generates analog data of three colors of RGB corresponding to a projected image. The signal processing section 15 performs signal processing of calculating the added-up value of the AF detection value and the added-up value of the luminance value in the auto-focus frame based on the digital image signal from the A/D conversion section 14. The control section 16 controls the signal processing section 15 and the auto-focus drive section 12 and delivers the image data also to the display section 17 when an auto-focus request comes from the control section 18. The signal processing section 15 and the control section 16 are realized by a single computer.

The configuration of the AF camera in FIG. 3 described above is the same as that of the conventional example, and the AF camera in the present embodiment differs from the conventional example in the detection processing of the focus position performed by the signal processing section 15 and the control section 16.

Figures 4A, 4B:
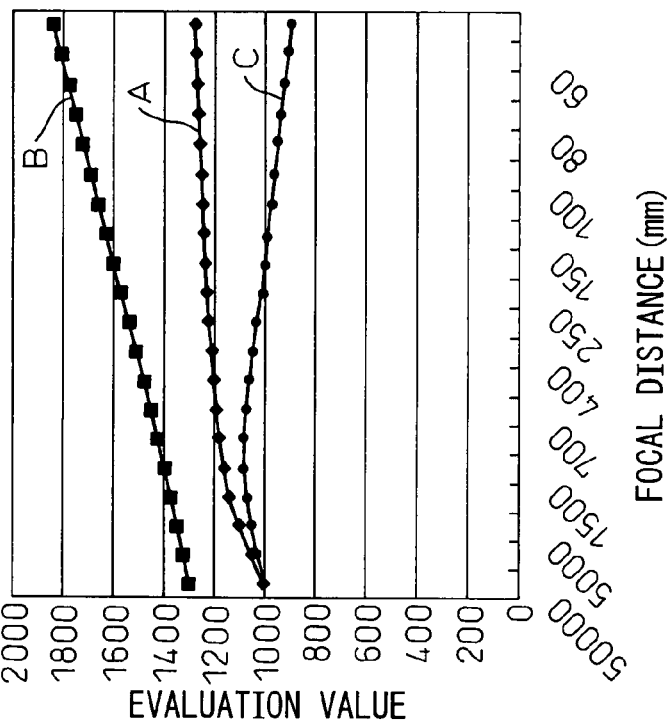
FIG. 4A and FIG. 4B are diagrams for explaining the focus position calculation processing in the first embodiment.

FIG. 4A and FIG. 4B are diagrams for explaining focus position calculation processing in the first embodiment; FIG. 4A shows the focal distance, the AF detection value, the luminance value, and the AF evaluation value at measurement points and FIG. 4B shows graphs in which the horizontal axis represents the focal distance and the vertical axis represents the AF detection value, the luminance value, and the AF evaluation value (corrected AF detection value), wherein A is a graph of the AF detection value, B is a graph of the luminance value, and C is a graph of the AF evaluation value (corrected AF detection value). The AF detection value (graph A) in FIG. 4B varies in the same way as the AF detection value in FIG. 1B.

As shown in FIG. 4A and FIG. 4B, the AF detection value increases as the focal distance decreases, however, the rate of increase gradually decreases. The luminance value increases as the focal distance decreases and the rate of increase is substantially constant.

In the first embodiment, if it is assumed that the luminance value at the start point is reference luminance L0, the luminance value at each point is L, and the AF detection values is S, then, an AF evaluation value (corrected AF detection value) H is calculated by the following expression.

$$H = S \times L0/L \tag{1}$$

In the case of the values in FIG. 4A, the AF evaluation value (corrected AF detection value) H varies as shown in FIG. 4B and the maximum value (peak value) is reached when the focal distance is 2,000 mm. As is obvious from the comparison with the conventional example shown in FIG. 1A and FIG. 1B, the AF detection value varies in the same manner, however, the position of the focal distance 50 mm is the focus position in the conventional example, but in the first embodiment, the position of the focal distance 2,000 mm is the focus position. When the focus state was checked actually, the position of the focal distance 2,000 mm in the first embodiment was proper as the focus position.

Figure 5:
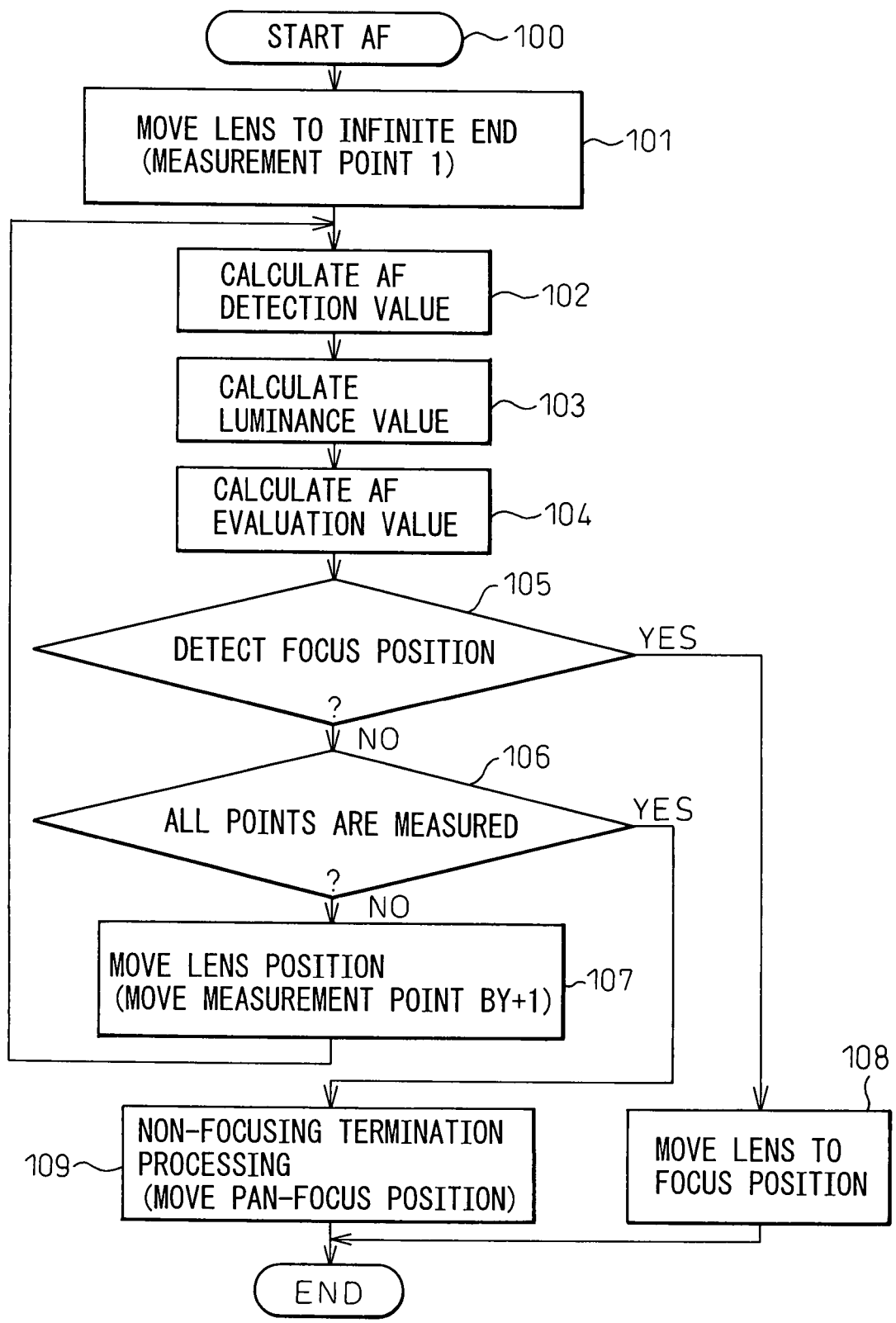
FIG. 5 is a flow chart showing the focus position calculation processing in the first embodiment.

FIG. 5 is a flow chart showing calculation processing of the focus position in the first embodiment. This processing is performed for the imaging data not subjected to auto-exposure (AF) processing.

The AF processing is started when an auto-focus start request is received from the control section 18 (step 100). When the auto-focus processing is started, the lens is moved to a measurement point 1 on the infinite end side in step 101 (refer to FIG. 4A).

In step 102, the AF detection values in the AF detection frame 2 are added up and the AF detection value at the measurement point is calculated.

In step 103, the luminance values in the AF detection frame 2 are added up at the same measurement point and the luminance value at the measurement point is also calculated.

In step 104, the AF evaluation value is calculated in accordance with the above-described expression (1) and is stored in the memory for each measurement point.

In step 105, by making a judgment of the mountain of the peak value by comparing the calculated AF evaluation value with the AF evaluation values at the previous several points, the focus position is detected. If it is not judged to be the peak value, the processing proceeds to step 106 and if it is judged to be the peak value, the processing proceeds to step 108.

In step 106, whether all the points are measured is judged and when the maximum measurement point (the point 20 in the example in FIG. 4A) is not reached, the processing proceeds to step 107 and when it has been reached, the processing proceeds to step 109.

In step 107, after the lens position is moved in order to shift the measurement point by +1, the processing returns to step 102 and steps 102 to 107 are repeated.

When it is judged to be the peak value in step 105, the lens is moved, in step 108, to the focus position based on the result in step 105. Incidentally, it is necessary for the calculated AF evaluation value to be smaller than the AF evaluation value at the previous measurement point in order that it is judged to be the peak value in step 105, and then, movement is made to the previous measurement point as the focus position, at which the AF evaluation value is maximum.

In step 106, when all the points are measured, it follows that the focus position has not been detected and in step 109, non-focusing termination processing, that is, the processing of moving to the pan-focus position, is performed.

The AF processing is completed after the processing in step 108 or step 109 is performed.

Figure 6:
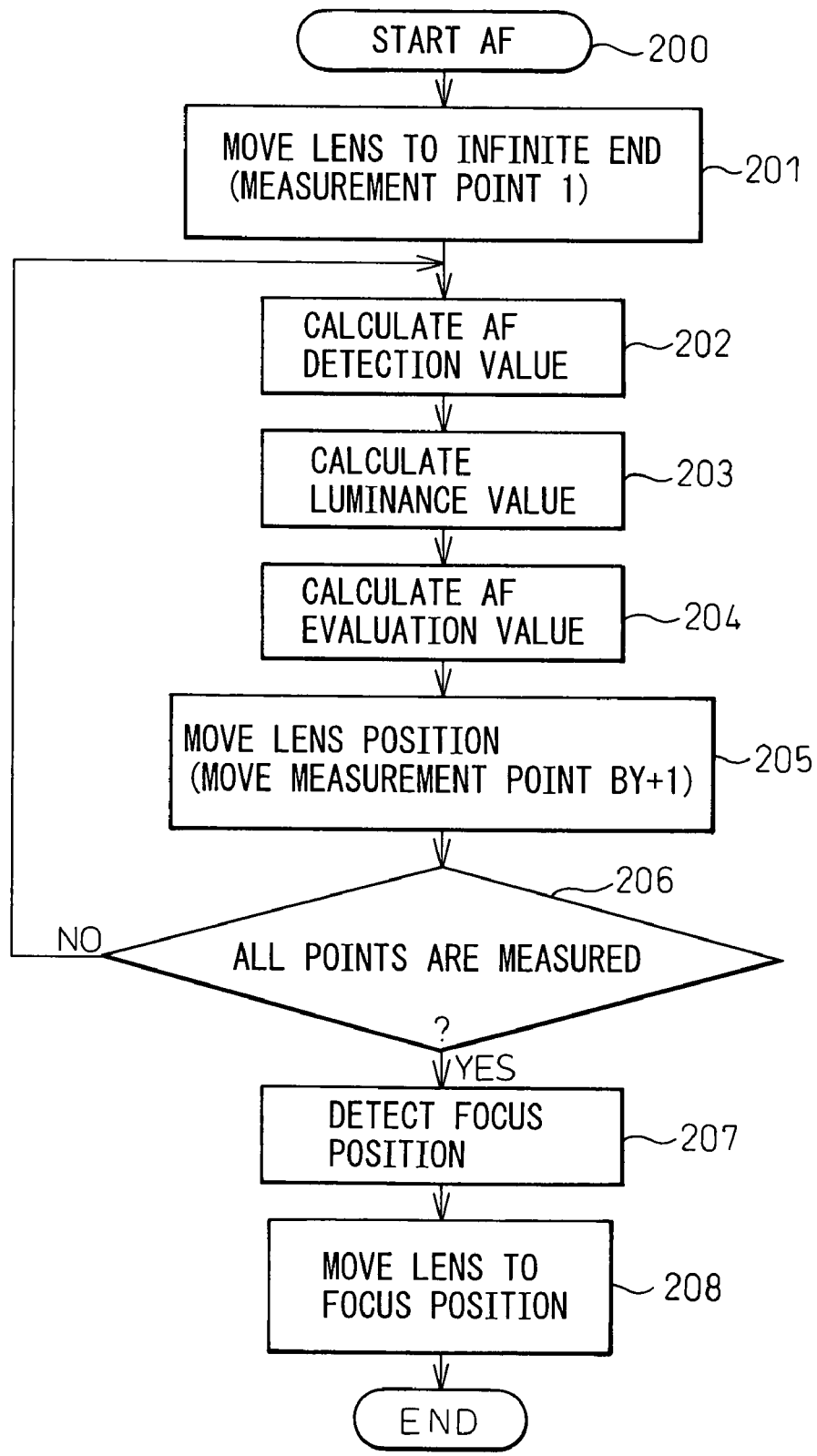
FIG. 6 is a flow chart showing the focus position calculation processing in a second embodiment.

FIG. 6 is flow chart showing the focus position calculation processing in a second embodiment. In the first embodiment, the focus position is calculated by the mountain-climbing method, however, in the second embodiment, the AF evaluation values (corrected AF detection values) at all the measurement points are calculated once and stored, and after the measurement at all the measurement points is completed, the peak position of the AF evaluation value is calculated. The second embodiment is effective when the AF evaluation value does not vary monotonically.

When the auto-focus processing is started, in step 201, the lens is moved to the measurement point 1, which is the infinite end side.

In step 202, the AF detection values in the AF detection frame 2 are added up and the AF detection value at the measurement point is calculated.

In step 203, the luminance values in the AF detection frame 2 are added up at the same measurement point and the luminance value at that measurement point is also calculated.

In step 204, the AF evaluation value is calculated in accordance with the above-described expression (1) and stored in the memory for each measurement point.

In step 205, the lens position is moved in order to shift the measurement point by +1.

In step 206, whether all the points are measured is judged, and if the maximum measurement point is not reached, the processing returns to step 202 and if it has been reached, the processing proceeds to step 207.

In step 207, by comparing the AF evaluation values at all the measurement points, the maximum point is detected as the focus position.

In step 208, the lens is moved to the focus position based on the result in step 207 and the AF processing is terminated.

FIG. 7 is a flow chart showing the focus position calculation processing in a third embodiment. Steps 302 to 304 in the third embodiment shown in FIG. 7 are processing performed instead of steps 102 to 104 in the focus position calculation processing in the first embodiment, or steps 202 to 204 of the focus position calculation processing in the second embodiment, and other processing is the same as that in the first embodiment or the second embodiment.

In the first and second embodiments, the AF evaluation value (corrected AF detection value) is calculated in accordance with the above-described expression (1) from the AF detection value, the luminance value at the start point (measurement point 1), and the luminance value at each point, however, in the third embodiment, the calculation method of the AF evaluation value is different.

In step 302, the luminance value at each measurement point is calculated.

In step 303, corrected image data is calculated by multiplying the image data acquired at each measurement point by the ratio of the luminance value at the start point (measurement point 1) to the luminance value at each measurement point.

In step 304, the AF detection value is calculated from the corrected image data by the same method as conventional one and is used as the AF evaluation value.

Several embodiments of the present invention are explained as above, however, the present invention is not limited to the embodiments explained above and it is obvious that there can be various modified examples.

The present invention can be applied to any imaging apparatus having an AF function.

We claim:

1. An imaging apparatus comprising:
an auto-focus drive section for moving a lens from a first position toward a second position:
an Auto-Focus processing section for calculating an Auto-Focus detection value indicating a focus state from imaging data, the focus state being from the first position to the second position;
a luminance processing section for calculating a luminance value from imaging data;
a correction section for calculating a corrected Auto-Focus detection value by multiplying the calculated Auto-Focus detection value by the ratio of the luminance value of the first position to a luminance value of a position which corresponds to the calculated Auto-Focus detection value; and
a control section for controlling the auto-focus drive section based on the calculated corrected Auto-Focus detection value.

2. The imaging apparatus as set forth in claim 1, wherein the imaging data is data not having been subjected to auto-exposure processing.

3. The imaging apparatus as set forth in claim 1, wherein the Auto-Focus detection value is an added-up value within a certain auto-focus frame in the imaging data.

4. The imaging apparatus as set forth in claim 3, wherein the luminance value is an added-up value of the luminance value within the auto-focus frame.

5. The imaging apparatus as set forth in claim 1, wherein the control section acquires imaging data by varying the focus position from the first position, which is assumed to be one end of the auto-focus range, toward the second position, which is assumed to be the other end, calculates the corrected Auto-Focus detection value from the imaging data, determines the focus position when the corrected Auto-Focus detection value indicates the peak value, and stops varying the focus position.

6. The imaging apparatus as set forth in claim 1, wherein the control section acquires imaging data by varying the focus position from a the first position, which is assumed to be one end of the auto-focus range, up to the second position, which is assumed to be the other end, calculates the corrected Auto-Focus detection value from the imaging data, determines the position at which the calculated corrected Auto-Focus detection value indicates the peak value as the focus position, and moves the lens to the determined focus position.

7. An imaging apparatus comprising:
an auto-focus drive section for moving a lens from a first position toward a second position;
a luminance processing section for calculating a luminance value from imaging data;
a correction section for calculating corrected imaging data, by multiplying the imaging data by the ratio of the luminance value of the first position to a luminance value of each position from the first position and the second position;
an Auto-Focus processing section for calculating a corrected Auto-Focus detection value indicating a focus state from the corrected imaging data, the focus state being from the first position to the second position; and
a control section for controlling the auto-focus drive section based on the corrected Auto-Focus detection value.

8. The imaging apparatus as set forth in claim 7, wherein:
the control section acquires imaging data by varying the focus position from the first position, which is assumed to be one end of the auto-focus range, toward the second position, which is assumed to be the other end, calculates the corrected Auto-Focus detection value from the corrected imaging data, determines the focus position when the corrected Auto-Focus detection value indicates the peak value, and stops varying the focus position
the.

9. The imaging apparatus as set forth in claim 7, wherein:
the control section acquires imaging data by varying the focus position from a the first position, which is assumed to be one end of the auto-focus range, up to the second position, which is assumed to be the other end, calculates the corrected Auto-Focus detection value from the corrected imaging data, determines the focus position when the calculated corrected Auto-Focus detection value indicates the peak value, and moves the lens to the determined focus position.

* * * * *